United States Patent [19]

Witt

[11] E Re. 30,605

[45] Reissued May 12, 1981

[54] GOOSE AND DUCK BLIND

[76] Inventor: Gordon Witt, Box 252, Millet, Alberta, Canada

[21] Appl. No.: 125,247

[22] Filed: Feb. 27, 1980

Related U.S. Patent Documents

Reissue of:

[64] Patent No.: 4,123,869
Issued: Nov. 7, 1978
Appl. No.: 845,346
Filed: Oct. 25, 1977

[30] Foreign Application Priority Data

Jun. 12, 1978 [CA] Canada ..... 305270

[51] Int. Cl.[3] ..... A01M 31/00
[52] U.S. Cl. ..... 43/1; 52/66
[58] Field of Search ..... 43/1; 52/66, 69, 73, 52/79.1

[56] References Cited

U.S. PATENT DOCUMENTS

| | | | |
|---|---|---|---|
| 2,816,297 | 12/1957 | Stanley | 43/1 |
| 2,837,777 | 6/1958 | White | 52/66 X |
| 3,018,857 | 1/1962 | Parham | 43/1 |

*Primary Examiner*—Nicholas P. Godici
*Attorney, Agent, or Firm*—Ernest Peter Johnson

[57] ABSTRACT

A hunting blind which resembles a stook of straw bales, houses and camouflages a hunter. The pyramid-like structure is built of box-like elements which are disengagably connected to form three tiers. Some of the walls of the box-like elements have been partially or totally cut away to form sufficient space within the structure for the hunter. The tiers are hingably connected to each other such that the box-like elements can be swung outwardly to allow the hunter an unobstructed hunting position. Storage and transportation is simplified by forming box-like elements of such dimensions that they may be nested to form a single, compact unit.

5 Claims, 5 Drawing Figures

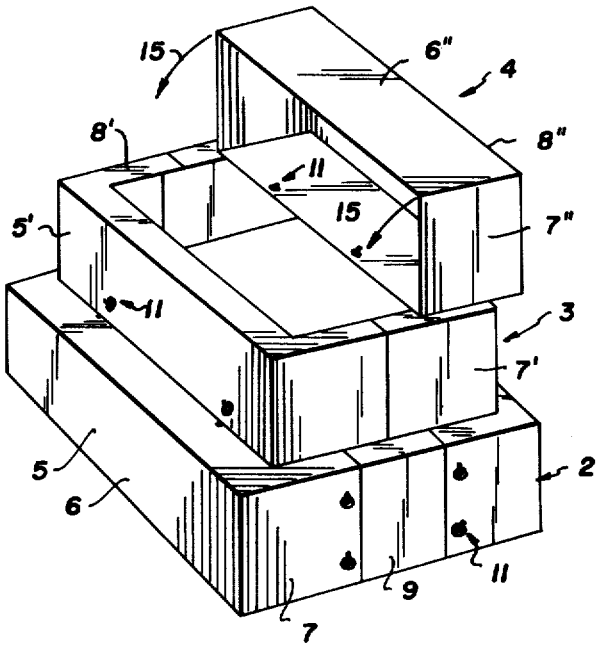
Fig. 4.
Fig. 5.
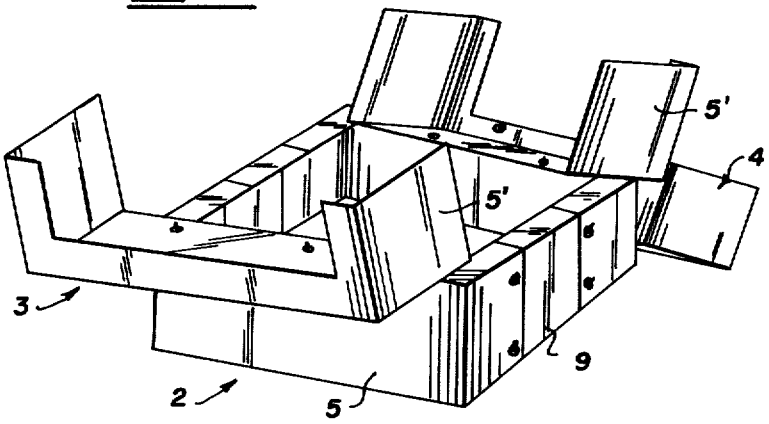

GOOSE AND DUCK BLIND

Matter enclosed in heavy brackets [ ] appears in the original patent but forms no part of this reissue specification; matter printed in italics indicates the additions made by reissue.

BACKGROUND OF THE INVENTION

The present invention relates to blinds, such as are used in goose and duck hunting.

The principal object of this invention is to provide a structure which appears to be a stook of straw bales and which is used to camouflage a hunter.

A further object is to provide such a portable blind which is portable, easy to assemble and easily stored or transported in a nested arrangement.

A still further object of this invention is to provide a structure wherefrom the hunter can spring essentially unhampered as the assembly swings open without falling apart. To return to a hidden state the hunter need only pull the assembly back into place.

SUMMARY OF THE INVENTION

In accordance with the invention, a plurality of box-like elements are combined to form a pyramid-like structure, which approximates the appearance of a stack of bales of hay. The elements may form a base tier, a middle tier and a top tier consisting of a single cap element. The middle and top tier elements are hingably connected to the base tier so that a hunter, seated within the structure, may pivot said elements outwardly to gain an unobstructed shooting position. The box-like elements may be disconnected and then nested together to form a load which can easily be transported by the hunter. A covering, which closely simulates the appearance of straw, is secured to the outside surfaces of the box-like elements. This covering, combined with the pyramid-like structure of the assembled element, gives effective camouflaging to hide the hunter until the appropriate moment.

Broadly stated, the invention is a game hunting blind comprising a box-like cap element having a two wall and side and end walls; first and second pairs of box-like elements, each having a side wall, two end walls and a partially cut away top wall; means for disengagably connecting the first pair of box-like elements to form a base tier; means for hingably and disengagably connecting each of the second pair of box-like elements with one of the base tier elements to form a middle tier wherein each of said second pair of elements rests on the partially cut away top wall of one of the base tier elements, said hinge connection being operative to permit the middle tier elements to be pivoted outwardly; and means for hingably and disengagably connecting the cap element with a middle tier element to complete the formation of a pyramid-like structure wherein the cap element rests on the partially cut away top walls of the middle tier elements, said hinge connection being operative to permit the cap element to be pivoted outwardly; said box-like elements being covered with a material having the appearance of straw and, when assembled in pyramid-like fashion, enclosing a space sufficient to house a hunter.

DESCRIPTION OF THE DRAWINGS

In the drawings:

FIG. 4 is a view of the assembled blind with the cap swung open on its hinges; and FIG. 5 is a view of a blind in its fully opened configuration.

DESCRIPTION OF THE PREFERRED EMBODIMENT

Figure 1:
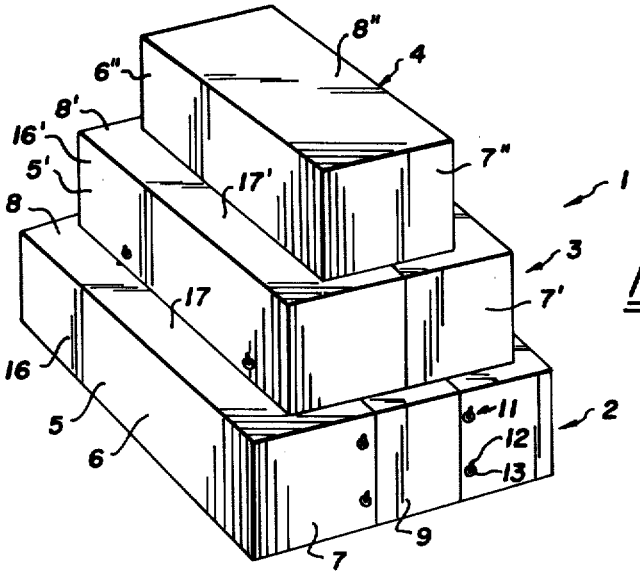
FIG. 1 is a view of the assembled blind.

The blind 1 shown in the drawings comprises a base tier 2, a middle tier 3 and a cap 4.

Each of the base and middle tiers 2, 3 is formed with box-like elements 5, 5' respectively. Each box-like element has one side wall 6, 6', two end walls 7, 7' and a partially cutaway top wall 8, 8'. The other walls preferably have been removed. The cap 4 consists of a box-like element with three side walls 6'', two end walls 7'' and a top wall 8''.

The width, depth and length of the box-like elements 5 and cap 4 preferably diminish from the base tier upwardly, so that they form a pyramid-like structure when assembled and can be nested for transportation.

The side walls 8, 8' have been partially cut away to form a ledge 20, 20' which supports the next tier and to provide ample space for the hunter within the structure. The bottom walls of the elements 5 of the base tier have been removed so that the structure can sit in a more stable fashion on rough or uneven terrain.

Figure 2:
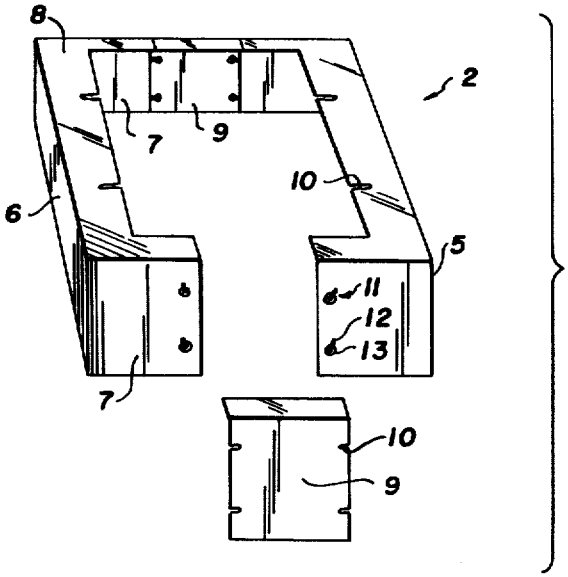
FIG. 2 is a perspective view of the base tier of the blind, partially assembled.

FIG. 2 illustrates a preferred form of the manner in which the base tier is assembled. The end walls 7 of two box-like elements 5 are joined by bulkheads 9 to form a rectangular base. The connection may be made by slipping slits 10 over a fastening means 11 formed by passing a rubber material 12, such as surgical tubing, through holes in the end walls 7 of the elements 5 and holding it in place with washers 13 by knotting the ends of the rubber material. When the rubber material is extended and slid through the slits 10, the washers prevent the rubber from slipping out. This same configuration can also function as a hinge as will be shown later.

The bulkheads 9 separate the two box-like elements 5 of the base to provide a larger open space and further serve to form a rigid assembly. As the hunter steps up to fire in the assembled structure, the succeeding tiers are thrown back causing a hinging leverage on the base elements. To keep the assembly from falling apart these base elements must be tied together.

Figure 3:
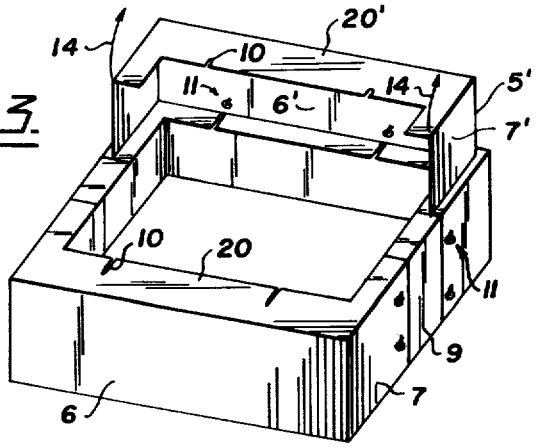
FIG. 3 shows the placement of one of the two members of the middle tier of the blind.

As shown in FIG. 3, the middle tier is formed by slipping fastening means 11 on the side wall 6' of a box-like element 5' into slits 10 on the cut-away top wall 8 of the base elements 5. Due to the elasticity of the rubber tubing 12 used in the fastening means 11, this joint also serves as a hinge about which the element 5' may be swung in a direction of arrows 14. The connection may be disengaged in a simple manner by withdrawing the tubing 12 from the slits 10.

The cap 4 is hinged to one of the middle tier box-like elements 5' so that it can be swung open or closed, as indicated by arrows 15. Because of its loosely hinged attachment, the cap 4 can be slightly moved off the side walls 8' forming the supporting ledge to allow the hunter to peek through the crack at any point therearound to spot the birds.

FIG. 5 illustrates the fully opened configuration of the blind wherein the middle tier box-like elements 5' and the cap 4 have pivoted outwardly without tearing the structure apart when the hunter has stood up. The hunter's shooting is unhampered and he can pull the assembly back over himself as he crouches down again.

The box-like elements are preferably constructed of double-walled cardboard so as to be sturdy and relatively light for carrying. The side walls 6, 6' may be reinforced along their self-supporting edges, by folding back flaps 16, 16' of the construction material, as well as along their supporting ledges by folding back flaps 17, 17' to form walls of double thickness.

The assembled configuration of the structure is similar to that of a stack of hay. The box-like elements are preferably covered with a rubber skin which gives the appearance, in color and texture, of real straw, thus providing excellent camouflage.

By way of example of the invention, the rubber skin was produced by forming a wax imprint of actual straw. A rubber molding liquid was poured into the waxed imprint to form a male mold having the rough texture of straw. A final female cast of casting resin was made from the male mold. The skin of rubber latex could then be formed by pouring latex liquid into the resin mold and providing proper coloring in the mold to form a final rough-surfaced rubber skin resembling the surface of a straw bale. This skin was then glued onto the outside surface of the box-like elements.

When disassembled, the blind is easily stored or carried since the box-like elements 5, 5' and the cap 4 can be nested one within the other. The two base elements 5 are longest but differ slightly in length so that one can be placed within the other. The lengths of the progressively higher tiers 3, 4 become smaller due to the pyrimidal shape of the blind and the two middle elements 5' are made of slightly differing lengths so that all the elements nest into a single stack.

While the present invention has been disclosed in connection with a preferred embodiment thereof, it should be understood that there may be other embodiments which fall within the spirit and scope of the invention as defined by the following claims.

The embodiments of the invention in which an exclusive property or privilege is claimed are defined as follows:

1. A game hunting blind comprising:

a box-like cap element having a top wall and side and end walls;

first and second pairs of box-like elements, each having a side wall, two end walls and a partially cut-away top wall;

means for disengagably connecting the first pair of box-like elements to form a base tier;

means for hingably and disengagably connecting each of the second pair of box-like elements with one of the base tier elements to form a middle tier wherein each of said second pair of elements rests on the partially cut-away top wall of one of the base tier elements, said hinge connection being operative to permit the middle tier elements to be pivoted outwardly;

and means for hingably and disengagably connecting the cap element with a middle tier element to complete the formation of a pyramid-like structure wherein the cap element rests on the partially cut away top walls of the middle tier elements, said hinge connection being operative to permit the cap element to be pivoted outwardly;

said box-like elements being covered with a material having the appearance of straw and, when assembled in pyramid-like fashion, enclosing a space sufficient to house a hunter.

2. A game hunting blind comprising:

a box-like cap element having a top wall and side and end walls;

first and second pairs of box-like elements, each having a side wall, two end walls and a partially cut away top wall;

a pair of bulkhead members;

means disengagably connecting each of the bulkhead members with the first pair of box-like elements to form a base tier wherein the bulkhead members each space apart the box-like elements and form a continuous surface in combination with two of the end walls of said first pair of box-like elements;

means for hingably and disengagably connecting each of the second pair of box-like elements with one of the base tier elements to form a middle tier wherein each of said second pair of elements rests on the partially cut-away top wall of one of the base tier elements, said hinge connection being operative to permit the middle tier elements to be pivoted outwardly;

and means for hingably and disengagably connecting the cap element with a middle tier element to complete the formation of a pyramid-like structure, wherein said cap element rests on the partially cut-away top walls of the middle tier elements, said hinge connection being operative to permit the cap element to be pivoted outwardly;

said box-like elements being covered with a material having the appearance of straw and, when assembled in pyramid fashion, enclosing a space sufficient to house a hunter.

3. A game hunting blind as set forth in claim 2 wherein:

the box-like elements of the base tier being of the same width and same depth but of slightly different lengths;

the box-like elements of the middle tier being of the same width and same depth as the box-like elements of the base tier but shorter in length than the latter;

the cap being of the same width and same depth as the box-like elements of the middle tier but shorter in length than the latter;

said box-like elements being of such dimensions that they may be nested within each other to form a single assembly.

4. A game hunting blind as set forth in claim 3 wherein the box-like elements of the base, middle and top tier and the bulkhead members are constructed from double-walled cardboard.

*5. A game hunting blind comprising:*

*a box-like cap element having a top wall and side and end walls;*

*first and second pairs of box-like elements, each having a side wall, two end walls and a partially cut-away top wall;*

*means for disengagably connecting the first pair of box-like elements to form a base tier;*

*means for hingably and disengagably connecting each of the second pair of box-like elements with one of the base tier elements to form a middle tier wherein each of said second pair of elements rests on the partially cut-away top wall of one of the base tier elements, said*

*hinge connection being operative to permit the middle tier elements to be pivoted outwardly; and*

*means for hingably and disengagably connecting the cap element with a middle tier element to complete the formation of a pyramid-like structure wherein the cap element rests on the partially cut away top walls of the*

*middle tier elements, said hinge connection being operative to permit the cap element to be pivoted outwardly, said box-like elements, when assembled in pyramid-like fashion, enclosing a space sufficient to house a hunter.*

* * * * *